(12) United States Patent
Bambi

(10) Patent No.: US 8,505,441 B2
(45) Date of Patent: Aug. 13, 2013

(54) ESPRESSO COFFEE MACHINE WITH PREINFUSION DEVICE

(75) Inventor: Piero Bambi, Sesto Fiorentino (IT)

(73) Assignee: La Marzocco, S.R.L., Florence (IT)

( * ) Notice: Subject to any disclaimer, the term of this patent is extended or adjusted under 35 U.S.C. 154(b) by 333 days.

(21) Appl. No.: 12/990,272

(22) PCT Filed: Apr. 30, 2008

(86) PCT No.: PCT/IT2008/000297
§ 371 (c)(1),
(2), (4) Date: Oct. 29, 2010

(87) PCT Pub. No.: WO2009/133578
PCT Pub. Date: Nov. 5, 2009

(65) Prior Publication Data
US 2011/0048243 A1  Mar. 3, 2011

(51) Int. Cl.
*A47J 31/44* (2006.01)
*A47J 31/057* (2006.01)

(52) U.S. Cl.
USPC .............................. 99/302 R; 99/300; 99/283

(58) Field of Classification Search
USPC .................... 99/302 P, 297, 302 R, 283, 295, 99/307, 300; 137/625.48, 625.67, 625.25, 137/625.68, 625.65
See application file for complete search history.

(56) References Cited

U.S. PATENT DOCUMENTS

| | | | | |
|---|---|---|---|---|
| 3,230,971 A | * | 1/1966 | Valente | 137/556.3 |
| 3,345,860 A | * | 10/1967 | Briggs | 73/40 |
| 4,505,191 A | * | 3/1985 | Longo | 99/300 |
| 5,598,764 A | * | 2/1997 | Bambi | 99/295 |
| 6,199,472 B1 | * | 3/2001 | Greiwe | 99/291 |
| 7,698,992 B2 | * | 4/2010 | Wei | 99/281 |
| 2005/0160918 A1 | * | 7/2005 | Winstanley et al. | 99/279 |
| 2009/0285953 A1 | * | 11/2009 | Renieris | 426/433 |

FOREIGN PATENT DOCUMENTS

EP          934719 A1 * 8/1999
WO   WO 2011140582 A1 * 11/2011

* cited by examiner

*Primary Examiner* — Geoffrey S Evans
*Assistant Examiner* — John J Norton
(74) *Attorney, Agent, or Firm* — Hart IP Law & Strategies

(57) ABSTRACT

An espresso coffee machine comprises a boiler and a pump for feeding hot water under pressure to one or more brew groups (1), each of which comprises a receptacle (24) for infusing a predetermined dose of ground coffee, a hot water feed pipe (38) and an outlet pipe (40). Manual operating means (30, 50) are provided at the inlet of each brew group for selectively putting the coffee powder receptacle (24) in communication with the water feed pipe (38), with the outlet pipe 40 or with both the pipes in order to preinfuse the coffee powder.

11 Claims, 7 Drawing Sheets

ESPRESSO COFFEE MACHINE WITH PREINFUSION DEVICE

TECHNICAL FIELD

This invention relates to professional espresso coffee machines. The invention relates in particular to an improved espresso coffee machine equipped with a device for controlled preinfusion of the coffee powder.

PRIOR ART

It is known that professional espresso coffee machines have one or more brew groups, each of which comprises a receptacle where infusion of a predetermined dose of coffee powder takes place. A boiler and a pump supply each brew group with hot water under pressure.

It is also known that to obtain a good quality espresso, it is good practice to preinfuse the coffee powder, that is, soak it with water at low pressure, before proceeding to infusion proper.

U.S. Pat. No. 5,598,764 describes an espresso coffee machine equipped, upstream of the infusion unit, with a device for damping the pressure of the water supplied by the boiler. The pressure damping device comprises a cylindrical chamber containing a piston which is acted upon by a calibrated spring in order to cancel out the volume of the chamber, so that the water pressure in the infusion unit gradually exceeds atmospheric pressure, and only when the chamber formed by the piston being lifted up has reached its maximum volume can the pressure in the infusion group reach the optimum value offered by the pump in order to dispense the espresso coffee.

This solution has inherent limitations, as also evidenced in EP0934719A1 which discloses an espresso coffee machine where a two-way solenoid valve, controlled by a control unit and by an adjustable timer, shuts off the water flow from the pump to the boiler. Preinfusion is obtained, at the beginning of the cycle, by inhibiting the flow of cold water from the pump to the boiler for a predeterminable length of time and allowing the hot water to flow over the coffee powder at a pressure of 1 to 1.5 Bar under the action of the steam generated in the boiler when a three-way valve puts the boiler in communication with the feed pipe of the receptacle containing the coffee powder. The preinfusion time is predetermined and programmed and can be changed by the user only acting on the timer.

DISCLOSURE OF THE INVENTION

The object of this invention is to provide an espresso coffee machine equipped with a device for preinfusing the coffee powder that overcomes the disadvantages of prior art espresso coffee machines.

In particular, it is an object of the invention to provide an espresso coffee machine where the preinfusion time can be set at the discretion of the user and if the machine has more than one brew group, independently for each group.

Another object of the invention is to provide an improved espresso coffee machine whose construction is based on a simple modification to existing machines.

The above objects are achieved by an improved espresso coffee machine as defined in the appended claims.

The advantages and technical characteristics of the invention will become more apparent from the following detailed description of a non-limiting example embodiment of it.

BEST MODE FOR CARRYING OUT THE INVENTION

Figure 1:
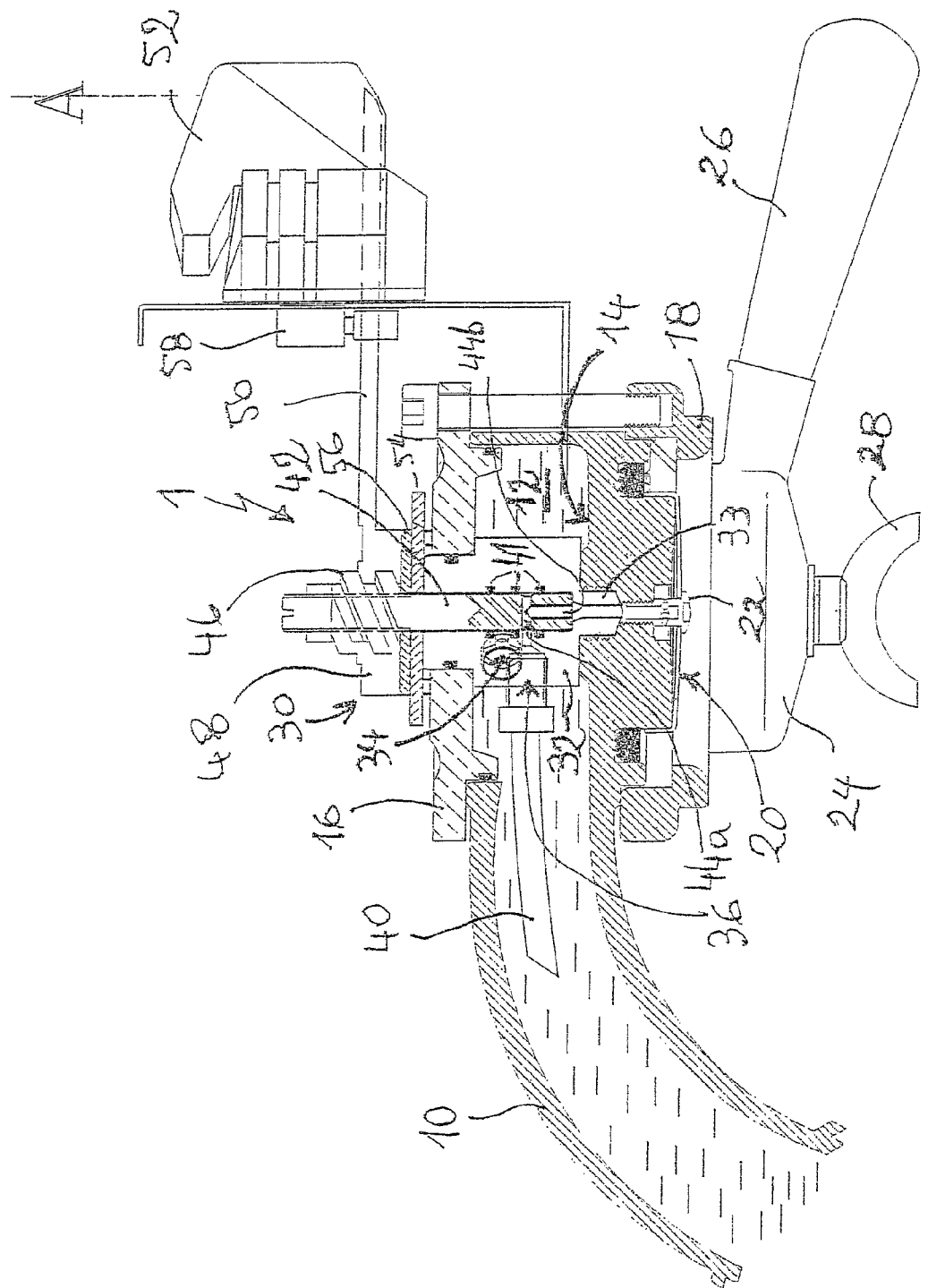
FIGS. 1, 3 and 5 are side views, partly in cross section, illustrating a brew group. of an improved espresso coffee machine according to the invention in three different operating modes.
Figure 2:
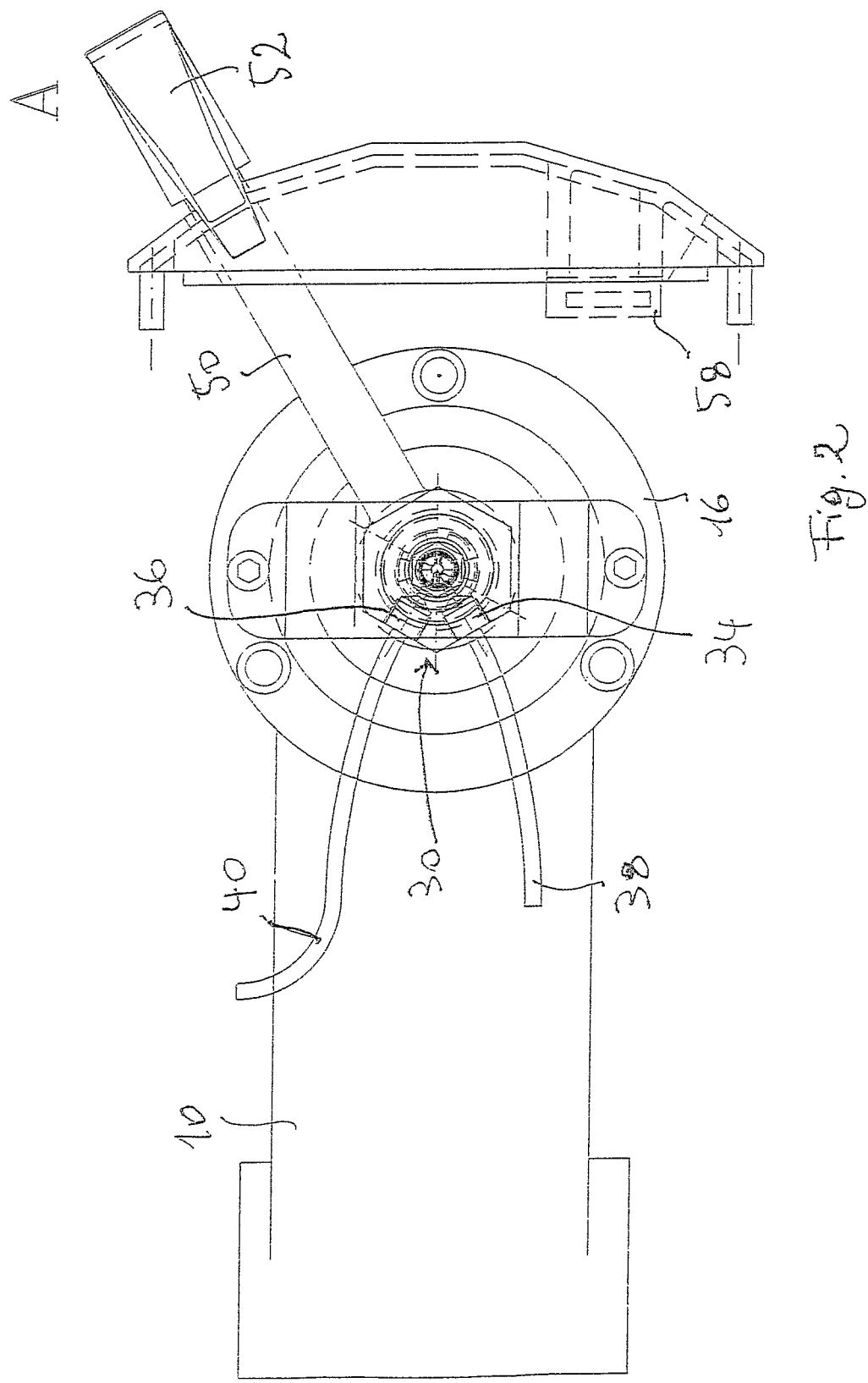
FIGS. 2, 4 and 6 are schematic top plan views of the brew group in the three operating modes.

With reference to FIGS. 1 and 2, a brew group 1 of an improved espresso coffee machine is made (see U.S. Pat. No. 5,598,764) in the end portion of a hollow arm 10 containing the heated water from the machine boiler (not illustrated).

In particular, the brew group comprises a vertical cylindrical chamber 12 having a base 14 with a hole in the middle of it and a cover 16 screwed to a ring 18.

A finely perforated disc 20 is connected to the underside of the base 14 of the chamber 12, by a screw 22 having holes made in it and seated in the lower portion of the hole made in the base 14.

Conventionally, a filter holder 24—provided with a handle 26 and dispensing spouts 28—is engaged by means of a bayonet coupling to the bottom of the ring 18 so that the coffee powder inside the filter located in the filter holder 24, is in contact with the finely perforated disc 20.

According to the invention, an element 30 for diverting and dividing the flow of hot water from the boiler is mounted in a sealed manner to the base 14 of the chamber 12 and extends vertically through the cover 16.

Figure 5:
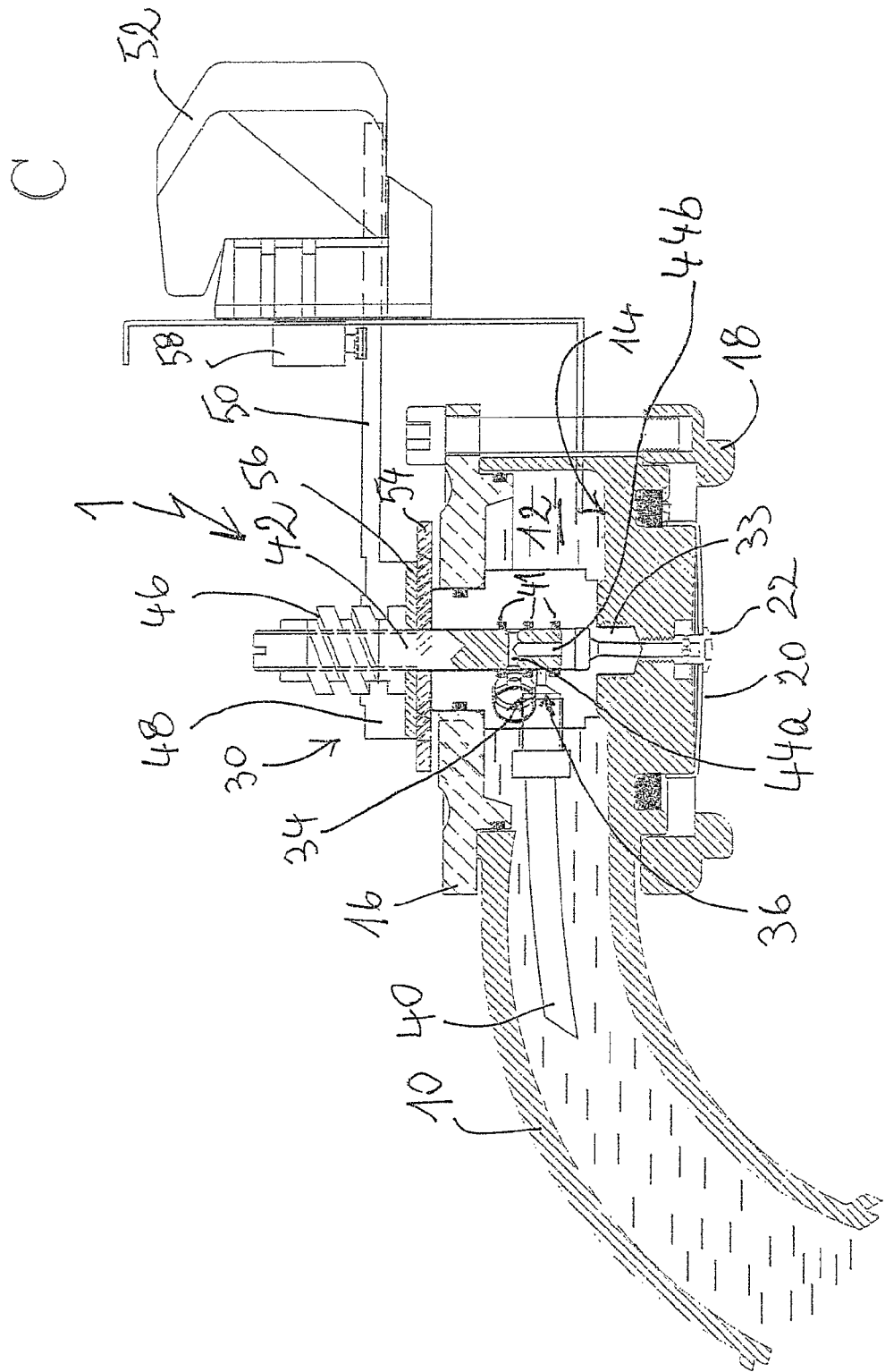

Said element 30 comprises a centrally hollow cylindrical body 32 coaxial with the chamber 12 and having at the bottom of it an externally threaded protrusion 33 inserted into the upper portion of the hole made in the base 14. Two openings 34, 36 are made in the side wall of the body 32 for connecting the internal cavity to a hot water feed pipe 38 (not shown in FIGS. 1, 3 and 5) and to an outlet pipe 40. Advantageously, the two openings are located at different heights and at an angular interval of approximately 60°; further, three sealing o-rings 41 are provided inside the body 32, above, below and between the two openings 34, 36.

The body 32 accommodates a piston 42 which moves axially inside it between a lowermost position and an uppermost position and which has, at its lower end, a horizontal through hole 44a and a vertical central hole 44b that connects with the horizontal hole. Thus, the holes 44a and 44b form an internal conduit that puts the side wall and bottom of the piston 42 in communication with each other.

As will appear more clearly below, when the piston 42 inside the body 32 is at the lowermost position, the horizontal hole 44a is at the same height as the opening 36 connected to the outlet pipe 40 (see FIG. 1). Similarly, when the piston 42 inside the body 32 is at the uppermost position, the horizontal hole 44a is at the same height as the opening 34 connected to the hot water feed pipe 38 (see FIG. 5).

The upper portion of the piston 42 protrudes upwards from the body 32, through the cover 16, and ends with a lead screw 46 coupled to a lead nut 48 located at the end of a drive rod 50 having a handle 52 at its opposite end. The rod 50 is made to rotate in a horizontal plane about the lead screw and nut system between two end positions (A, C) in such a way as to raise or lower the piston 42.

Advantageously, a disc 54 for guiding and centring the piston and a teflon disc 56 are provided between the body 32 and the lead nut 48.

A microswitch 58 for starting the pump is mounted on the machine frame at a position where it is triggered by the rod 50 in one of the end positions (position C in the embodiment illustrated in the drawings).

Below is a description of how the above improved espresso coffee machine works.

With reference to FIGS. 1 and 2, before dispensing the espresso, the rod 50 is moved to the end position A opposite the end position C where the microswitch 58 is located. The piston 42 is therefore at the lowermost position inside the body 32, where the conduit 44a, 44b inside it puts the outlet pipe 40 in communication with the bottom of the piston and, hence, through the hollow screw 22 and the finely perforated disc 20, with the filter holder 24 below, containing the coffee powder. In this operating mode, the hot water feed pipe 38 is closed at the inlet 34 of the body 32.

Figure 3:
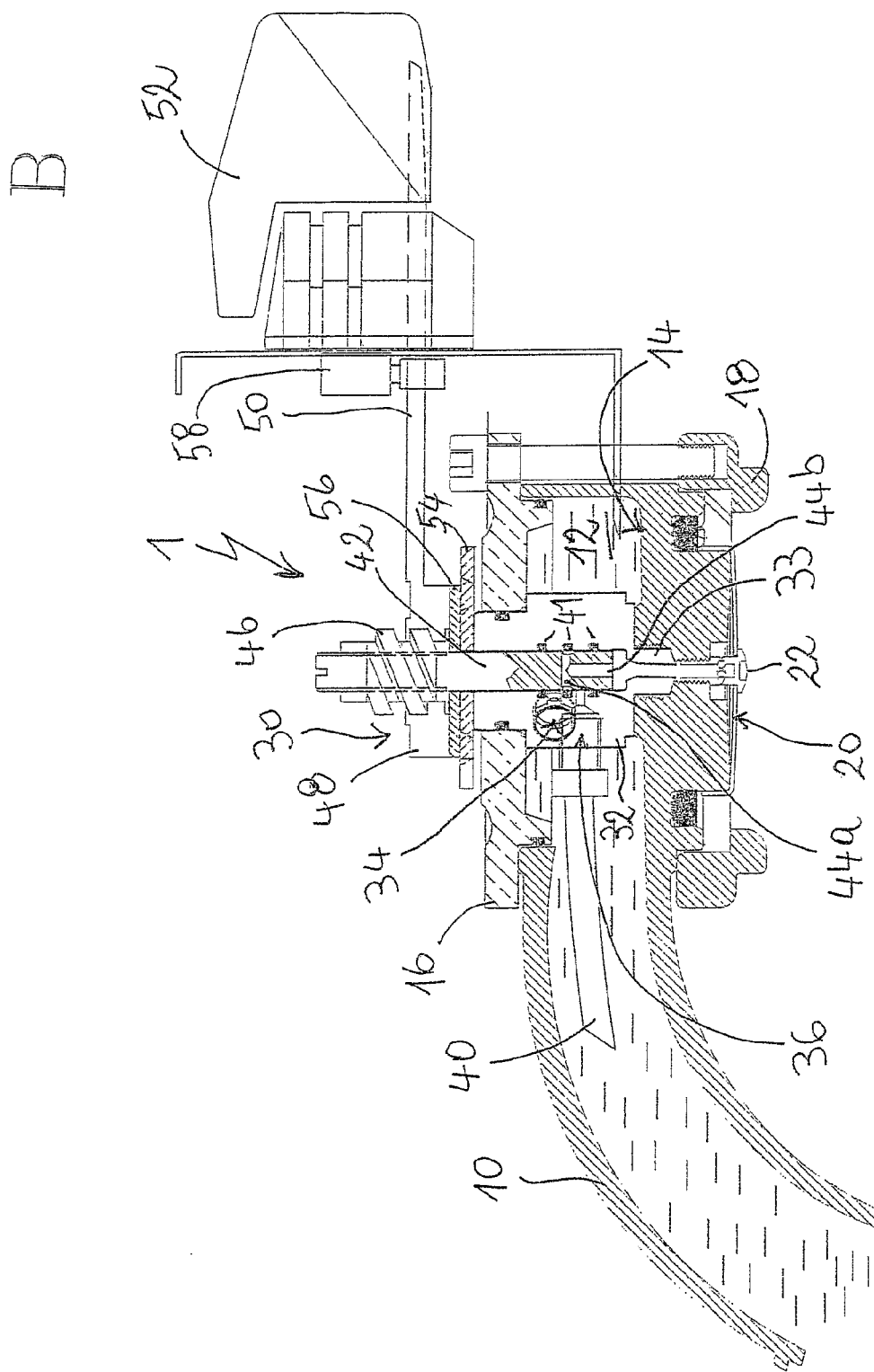
Figure 4:
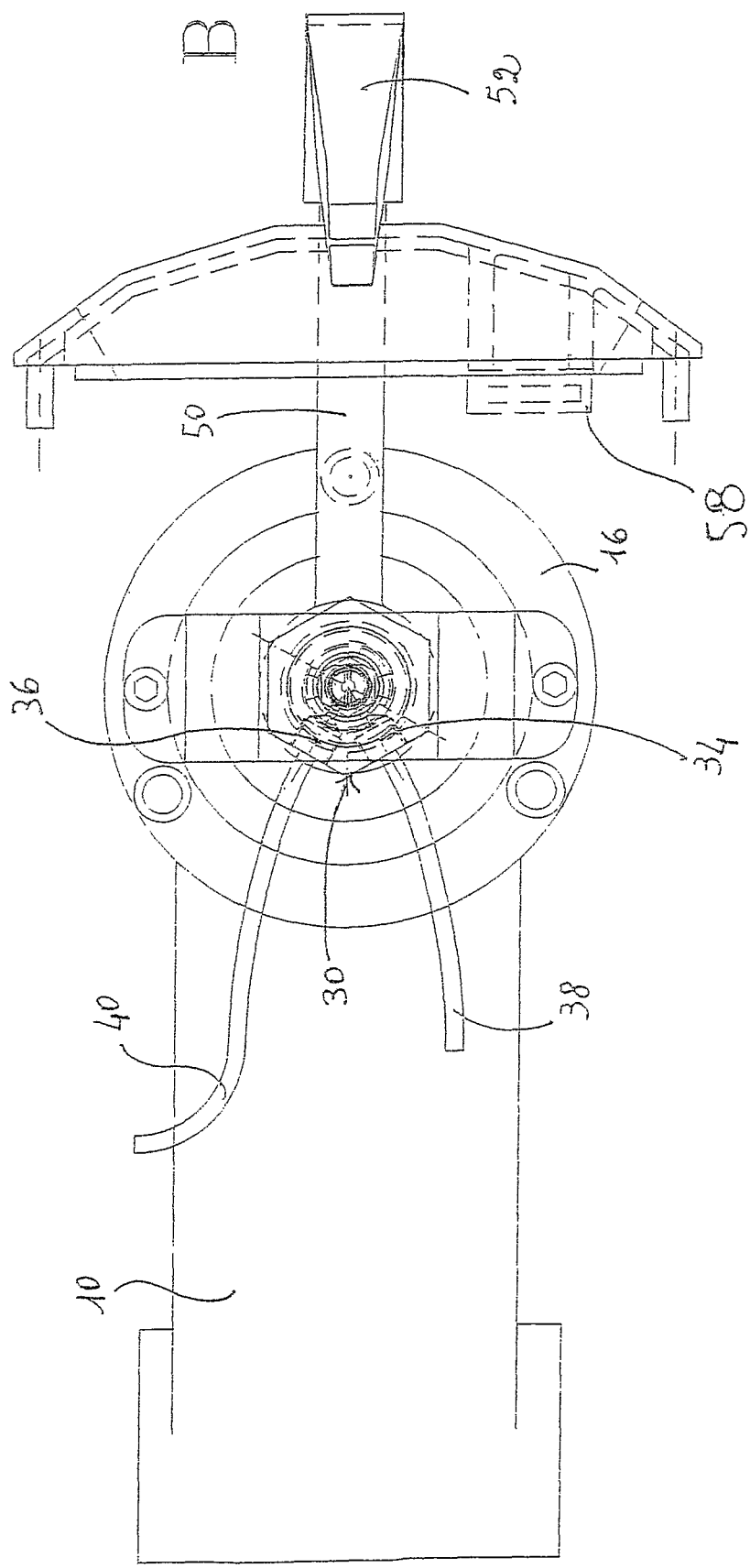

As illustrated in FIGS. 3 and 4, moving the rod 50 to the position B intermediate between the end positions A and C, causes the piston 42 to be partly lifted so that the horizontal hole 44a is located at an intermediate position between the openings 34, 36. This puts the hot water feed pipe 38 in partial communication with both the outlet pipe 40 and with the internal conduit 44a, 44b in the piston 42. In this operating mode, the hot water from the feed pipe 38 is partly diverted towards the outlet and partly channelled onto the coffee powder to obtain preinfusion for any desired length of time, at the user's discretion.

Figure 6:
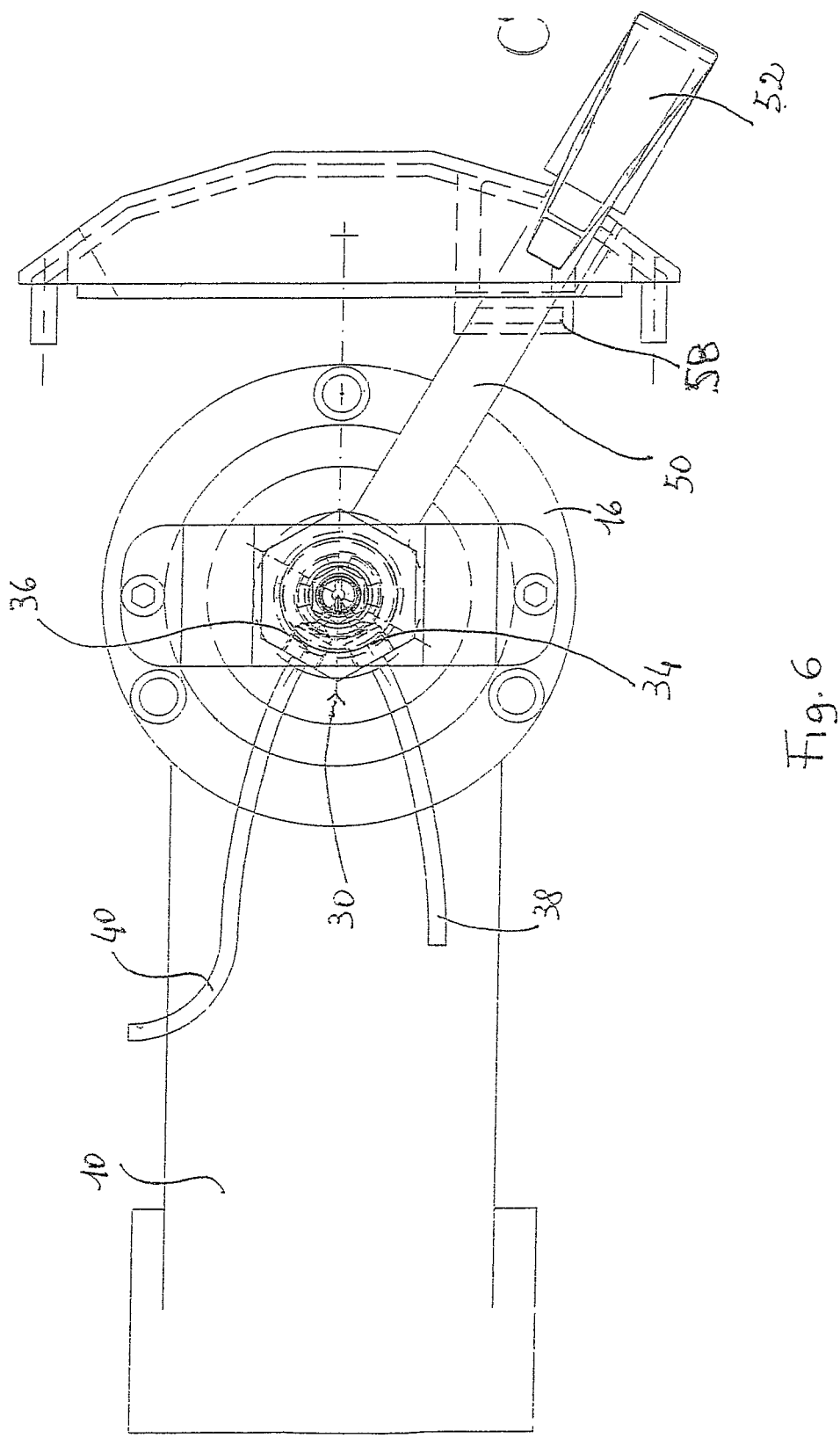

After preinfusion, the rod 50 is moved to position C (see FIGS. 5 and 6) and the piston 42 lifted to the position where the feed pipe 38 is in communication with the filter holder. The simultaneous triggering of the microswitch 58 starts the pump which feeds water under pressure to the brew group so as to produce the espresso.

It should be noticed that a flow diverter and divider 30 according to the invention allows the coffee powder to be preinfused (that is, preliminarily soaked with hot water at low pressure) even if the pump is already on and coffee is being served from at least one other brew group. Even under these conditions, when the rod 50 is in the intermediate position B, the pressure of the water channelled onto the coffee powder is appreciably reduced by diverting a part of the water flow towards the outlet.

Figure 7:
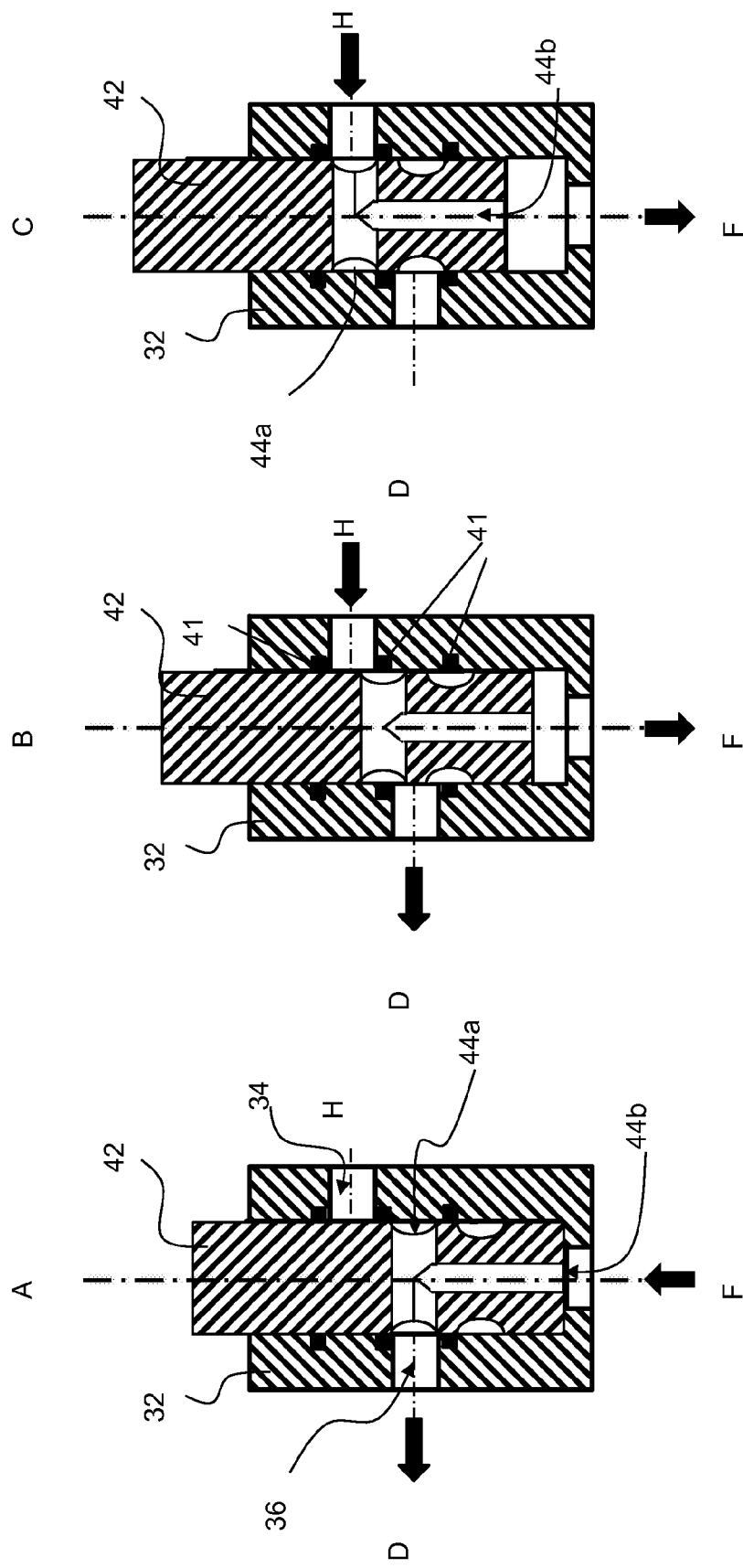
FIG. 7 is a schematic section view of the preinfusion device in the three group operating modes illustrated in FIGS. 1, 3, 5 and 2, 4, 6.

FIG. 7 schematically illustrates the three operating modes of a flow diverter and divider according to the invention, showing for each mode the respective communication paths activated between the boiler H, the outlet D and the filter holder F.

The invention claimed is:

1. An espresso coffee machine comprising a brew group having a boiler and a pump for feeding a flow of hot water under pressure to the brew group, wherein the brew group comprises: a receptacle for infusing a predetermined dose of ground coffee, a hot water feed pipe and an outlet pipe; wherein the espresso coffee machine further comprises a manual operating element for diverting and dividing the flow of hot water from the boiler at the inlet of the brew group for selectively putting the infusion receptacle in communication with one of (1) the water feed pipe, (2) the outlet pipe, and (3) simultaneously both the water feed pipe and the outlet pipe in order to preinfuse coffee powder, wherein the element is configured to manual operation by a user so that preinfusion time can be set at a discretion of the user.

2. The machine according to claim 1, wherein the element for diverting and dividing the flow of hot water comprises:
a centrally hollow cylindrical body having a side wall with two openings for connecting its internal cavity to the hot water feed pipe and to the outlet pipe, respectively;
a piston that moves axially within the cylindrical body, wherein the piston has a horizontal through hole and a vertical hole which is connected to the horizontal hole in such a way as to form an internal conduit that puts the side wall of the piston in communication with a bottom of the piston;
a drive rod for moving the piston between a lowermost position, an intermediate position and an uppermost position in such a way that the internal conduit in the piston puts the infusion receptacle in communication only with the outlet pipe or puts the hot water feed pipe in partial communication with both the outlet pipe and with the infusion receptacle for preinfusion or puts the feed pipe in communication only with the infusion receptacle for dispensing the espresso.

3. The machine according to claim 2, further comprising a lead screw and nut system cooperating with the drive rod.

4. The machine according to claim 2, wherein it further comprises a microswitch for starting the pump, the microswitch being designed to be triggered when the water feed pipe is in communication only with the espresso dispensing receptacle.

5. The machine according to claim 2, wherein the two openings of the centrally hollow cylindrical body are located at different heights along an axis of the cylindrical body.

6. The machine according to claim 2, wherein the two openings of the centrally hollow cylindrical body are located at an angular interval of approximately 60°.

7. The machine according to claim 2, wherein the drive rod comprises a handle.

8. The machine according to claim 1, wherein the machine comprises a plurality of brew groups, wherein the pump feeds a flow of hot water under pressure to the plurality of brew groups.

9. The machine according to claim 1, wherein the brew group comprises a vertical cylindrical chamber having a base with a hole in the middle thereof and a cover screwed to a ring.

10. The machine according to claim 9, wherein the manual operating element for diverting and dividing the flow of hot water from the boiler is mounted in the vertical cylindrical chamber and extends vertically.

11. The machine according to claim 10, wherein the element for diverting and dividing the flow of hot water comprises:
a centrally hollow cylindrical body comprising having a side wall with a first opening for connecting an internal cavity of the cylindrical body to the hot water feed pipe and a second opening for connecting the internal cavity of the cylindrical body to the outlet pipe;
a piston that moves axially within the cylindrical body, wherein the piston has a horizontal through hole and a vertical hole which is connected to the horizontal through hole in such a way as to form an internal conduit that puts a side wall of the piston in communication with a bottom of the piston;
a drive rod for moving the piston between a lowermost position, an intermediate position and an uppermost position, so that
when the piston is in the lowermost position, the piston internal conduit puts the infusion receptacle in communication only with the outlet pipe, when the piston is in the intermediate position, the hot water feed pipe is in partial communication with both the outlet pipe and with the infusion receptacle for preinfusion, when the piston is in the uppermost position, the piston internal conduit puts the feed pipe in communication only with the infusion receptacle for dispensing the espresso.

\* \* \* \* \*